United States Patent [19]

Adams

[11] Patent Number: 4,662,163

[45] Date of Patent: May 5, 1987

[54] MOBILE SPRAY APPLICATOR AND METHOD OF SPRAYING FORAGE

[76] Inventor: Danny R. Adams, R.R. #2, Marion, Ill. 62959

[21] Appl. No.: 702,760

[22] Filed: Feb. 19, 1985

[51] Int. Cl.⁴ .......................................... A01D 39/00
[52] U.S. Cl. ..................... 56/341; 56/16.8; 100/74
[58] Field of Search .......... 56/16.4, 364, 400, 341, 56/168; 100/73-75

[56] References Cited

U.S. PATENT DOCUMENTS

| | | | |
|---|---|---|---|
| 2,539,834 | 1/1951 | Hatton | 56/372 |
| 2,698,170 | 12/1954 | Foley | 56/16.4 |
| 3,178,876 | 4/1965 | Lundberg | 56/400 |
| 3,734,777 | 8/1970 | Bratschitsch | 134/132 |
| 3,834,141 | 9/1974 | Bracht et al. | 56/DIG. 5 |
| 3,866,397 | 2/1975 | Koziol | 56/16.8 |
| 4,228,638 | 10/1980 | Rabe et al. | 100/74 |
| 4,240,244 | 12/1980 | Martin | 56/16.4 |
| 4,254,605 | 3/1981 | Maher et al. | 56/16.4 |
| 4,255,922 | 3/1981 | Hiyama | 56/330 |
| 4,257,215 | 3/1981 | Maher et al. | 56/14.4 |
| 4,294,063 | 10/1981 | Bianchi | 56/16.4 |
| 4,327,537 | 5/1982 | Wolrab | 56/341 |
| 4,352,267 | 10/1982 | Mellinger | 56/341 |
| 4,369,596 | 9/1981 | Hartford | 47/1.5 |
| 4,512,146 | 4/1985 | Klinner | 56/16.4 |

FOREIGN PATENT DOCUMENTS 2420296 11/1979 France .................. 56/16.4

*Primary Examiner*—Paul J. Hirsch
*Attorney, Agent, or Firm*—Beveridge, DeGrandi & Weilacher

[57] ABSTRACT

A mobile spray applicator for treating forage with a liquid chemical spray after it first picks up the windrow, and separates and spreads out the windrow material across the width of a moving conveyor belt while holding a portion of the material spaced from the surface of the conveyor belt. The spread out material forms a plurality of openings and interstices therethrough so that as it exits from the end of the conveyor, the upper surface of the forage is flood or mist sprayed with the liquid chemical. The chemical enters the openings and interstices and coats the upper surfaces of the forage disposed therebelow. As the sprayed forage falls away from the conveyor exit, its undersurface is also flood or mist sprayed so that a substantial portion of the forage is coated or wetted with the chemical. Liquid chemical agents which can be so applied include drying agents, nutrients, feed supplements, feed flavorings and the like. The surface of the conveyor belt is provided with a plurality of sinuous bars spaced from each other, the crests of which each have a pair of fingers in V-formation, which fingers assist in the separating and spreading out of the forage across the width of the conveyor surface. The crests in each bar are about 90° out of phase with the crests in adjacent bars on the conveyor belt surface.

12 Claims, 4 Drawing Figures

MOBILE SPRAY APPLICATOR AND METHOD OF SPRAYING FORAGE

The present invention relates generally to a mobile spray applicator for picking up windrowed forage, such as hay, cornstalks and the like, spreading it out to expose a large surface area of the forage and spraying a maximum surface area of such spread out forage with a chemical agent. The invention also relates to a method of expeditiously and economically treating forage with a chemical agent to obtain desired beneficial results, such as improved feed for livestock.

BACKGROUND OF THE INVENTION

After a standing crop is mowed or cut, the windrow is left for two or three days to "cure" in the sun and wind before being picked up with a hay baler and baled. U.S. Pat. No. 4,254,605 states that the moisture content of the windrow material should be approximately 17% by weight at the time it is baled and cautions that if the material becomes overcured, it then fractures on impact and produces unsatisfactory bales likely to crumble during baling. The patentee provides a hay conditioner which picks up the windrow material, deposits it on a conveyor where it lies flat as it is being conveyed, sprays the upper surface of the material with steam from a steam generator and then deposits the steam conditioned hay on the ground for either subsequent pick-up by a hay baler or the treated material is discharged onto the conveyor of a following hay baler.

It is also known in the art to apply chemicals, such as preservatives to grain or the like. Thus, in U.S. Pat. No. 3,734,777, grain is placed into a hopper and as it is conveyed upwardly out of the hopper, it is sprayed with a preservative so as to prevent the growth of mold. The patentee thus eliminates the step of drying the harvested grain which was the common practice for preventing the growth of mold and the like thereon.

U.S. Pat. No. 4,257,215 discloses a mobile chaffcutter in which windrowed hay is picked up and conveyed to a chaff-cutter by means of a covered conveyor. As the hay moves along the conveyor, it is moistened by steam applied to it through jets located beneath the input region of the conveyor.

U.S. Pat. No. 4,240,244 discloses a mobile forage harvester for harvesting the crop material, chopping the material and blowing the chopped material into a receptacle. The harvester is provided with a water supply system for periodically injecting a controllable amount of water into the stream of crop material to minimize gumming up of the material in the harvester.

SUMMARY OF THE INVENTION

The invention relates to a mobile spray applicator for forage, and particularly for windrowed forage including hay, corn stalks, milo stubble, sorghum, and the like, wherein the forage is treated with a chemical agent, such as the known drying agents, so that hay, for example, can be baled in the wet stage and will dry and cure after it has been baled. Alternatively, the forage can be treated with a chemical nutrient or supplement so that the grower can take a poor crop, spray it with the nutrient or supplement, and produce a more desirable crop for feeding livestock. Furthermore, treating such crops with artificial flavoring, such as alfalfa, will induce livestock to consume a greater variety of forage.

The spray applicator of the present invention is completely mobile to permit its free movement among windrow material to be chemically treated. The present applicator provides the means for thorough chemical spray treatment of all types of forage usable as feedstuff for livestock. It further permits treatment of such forage with any one of a plurality of desired chemical agents.

The spray applicator of the present invention includes means for picking up the forage from the ground and placing it on a conveyor provided with spreading means for spreading and separating the forage, such as hay, corn stalks, sorghum, or the like across the width of the conveyor while holding a substantial or considerable portion of the forage spaced above the conveyor surface, the remainder being carried on the conveyor surface. The spreading means includes a plurality of sinuous members affixed (at their trough portions) at spaced intervals along the conveyor surface and a series of pairs of fingers, preferably extending outwardly in a V-shaped formation and affixed at their lower portion to those parts of the sinuous members which are spaced from the conveyor surface, i.e. the crests of such members. Thus, as the windrow material is picked up from the ground by the fingers of a pick-up reel and deposited on the conveyor, the windrow material is spread out over the width of the conveyor and is carried along the conveyor by the series of V-shaped pairs of fingers and by the surface of the conveyor.

Spray nozzles are provided on the applicator together with a liquid chemical storage tank and a pump for supplying the liquid from the tank to the nozzles. The nozzles are preferably of the flood or mist spraying type and are located above the exit end of the conveyor so that as the separated and spread out forage is being conveyed out of the back of the conveyor, it is subjected to flood or mist spraying of the chemical, which covers the upper surfaces of the forage and also enters between the openings in the spread out forage exiting from the conveyor to cover the upper surfaces of the forage disposed below such openings.

Likewise, a plurality of flood or mist spray nozzles are provided substantially along the width of the conveyor and are located below the exit end of the conveyor and preferably rearwardly of the exit end, so that such nozzles flood or mist spray the undersurface of the forage as it is falling away from the exit end of the conveyor.

The present invention also relates to a method of chemically treating forage wherein the forage is introduced into a zone and is separated and spread out across the width of the zone as it enters and passes through the zone. The height of the zone will be determined by the distance from the surface of the conveyor to the uppermost forage or portions of forage held by the fingers in spaced relationship to such surface. The forage is separated and spread out so that there are a plurality of openings and interstices formed between the forage at the top of the zone, which openings and interstices provide the paths for the chemical agent to reach the forage at the lower end of the zone. The upper surface of the spread out forage is then subjected to flood or mist spraying of the chemical as it exits the zone. Likewise, the undersurface of the forage is subjected to flood or mist spraying as the forage is falling away from the zone. Thus, essentially most if not substantially all of the forage has its surfaces chemically treated or coated with the liquid chemical.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals:

FIG. 4 is a fragmentary cross-sectional side view, similar to FIG. 1, but with extraneous members not included, showing the features of picking up and spreading out the forage on the conveyor and flood or mist spraying the upper and undersurfaces of the forage as it exits from the conveyor zone.

DESCRIPTION OF THE PREFERRED EMBODIMENT

Figure 1:
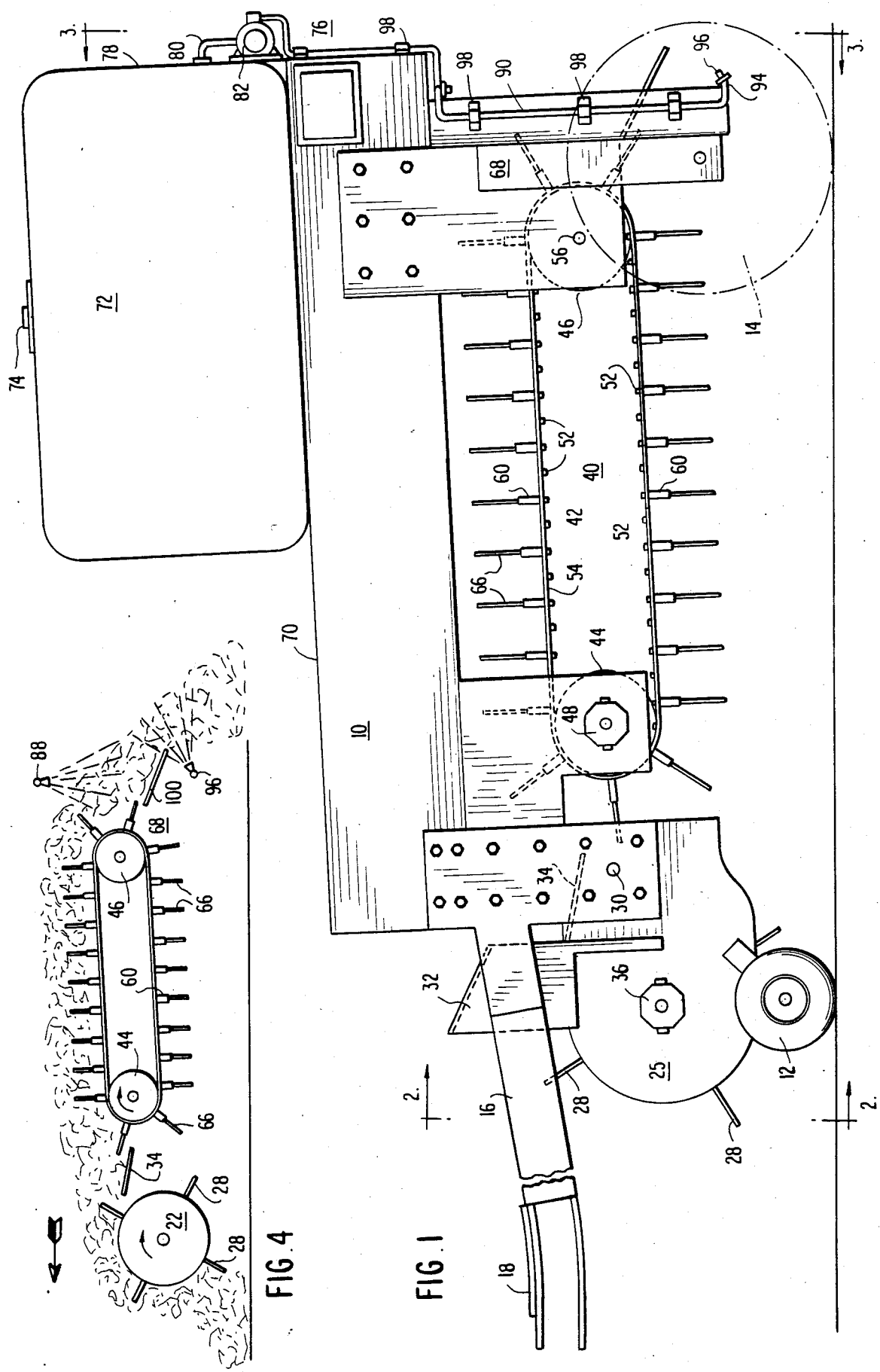
FIG. 1 is a vertical cross-sectional side view, depicting a spraying machine in accordance with the present invention.
Figure 2:
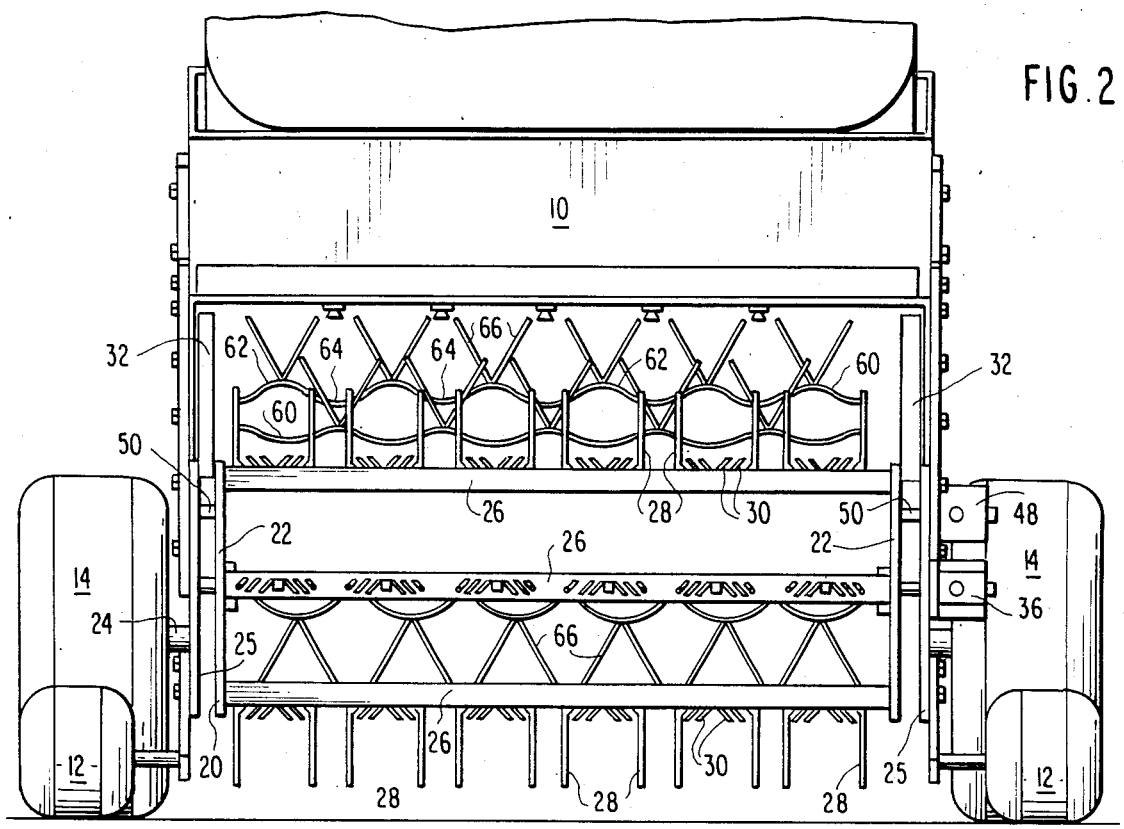
FIG. 2 is a view in front elevation taken along line 2—2 of FIG. 1.

As shown in FIGS. 1 and 2, the mobile spray applicator has a chassis 10 mounted on dual front casters 12 and back wheels 14 and is provided with a hitch 16 bolted to hitch plates (not shown) on either side of the chassis. Hitch 16 is provided with tongue 18 which is adapted to be attached to the rear of other forage processing devices, such as haylines, rakes, or even a tractor, and thus be towed through the field.

While in the preferred embodiment the spray applicator is designed to be towed, it is to be understood that the spray applicator can be made to be of the self-propelled type.

Forage pick-up reel 20, consisting of a pair of spaced annular plates 22 mounted for rotation about axle 24 journaled in side carrier plates 25 on each side of the chassis, is disposed at the front of the chassis between the caster wheels 12. A plurality of bars 26 extend axially between plates 22 and are secured thereto at their ends. Each bar is provided with a plurality of tines 28 extending radially outwardly from pick-up reel 20, which tines make contact with and lift forage material from the ground and carry it rearwardly into the chassis. Bars 26 are also provided with short pins or fingers 30 extending at angles to and disposed between pairs of tines 28 for grasping the hay or like forage and preventing its sliding from pick-up reel 20. When not in operation, side carrier plates 25 together with reel 20 and casters 12 can be pivoted about an axis of rotation defined by pivot pins 30 (one shown in FIG. 1), to facilitate movement of the mobile spray applicator to another site. If desired, the casters can be separately mounted on the chassis so as not to be pivotally moveable with the side carrier plate. Instead, the casters can be used to provide support to the spray applicator as it is moved to another location.

A hydraulic drive assembly 36 of any type well known to the art rotates pick up reel 20, side carrier plates 25 and casters 12 about the horizontal axis at pivot pins 30.

Deflectors 32 are provided on the chassis at each side of reel 20 to prevent the forage picked up by tines 28 from spilling over the sides of the applicator. Shield 34 (FIG. 1) is disposed rearwardly of reel 20 on the chassis and is provided with slots through which tines 28 readily pass as they deposit the forage thereon for pick up by the conveyor means, as will be discussed infra.

Mounted rearwardly of pick-up reel 20 on chassis 10 is a conveyor 40 comprising an endless belt 42 mounted for rotation about drive rollers 44, 46. In the preferred embodiment hydraulic drive assembly 48 is mounted on the side of the chassis adjacent the front drive roller 44 and drives roller 44 which is geared (gears not shown) to drive similarly geared rear drive roller 46. Front drive roller 44 rotates about axle 50 which is engaged and driven by hydraulic drive assembly 48, by any of the drive means known in the art.

Endless belt 42 has a plurality of bars 52 uniformly spaced from each other and secured to the undersurface 54 thereof by screws, studs, bolts or other fastening means known in the art. The bars extend across the width of the undersurface of the conveyor belt 42, and engage corresponding grooves (not shown) in drive rollers 44, 46 which rotate about axles 50, 56, and drive the conveyor belt 42.

Secured to the upper surface 58 of belt 42 are a plurality of sinuous bars 60, preferably uniformly spaced from each other, and extending across the width of the belt 42. The bars are secured to the belt along those lower portions of the bar which are in contact with the upper surface of the belt, preferably by means of bolts or screws extending through corresponding holes in the lower portions of the sinuous bar and the conveyor belt. Other means for securing the sinuous bars to the belt will be readily evident to those in the art. As seen in FIG. 2, sinuous or serpentine bar 60 has six crest portions 62 and five full trough portions 64 and a half of a trough portion at each end of the bar. It is at the trough portions 64 that bars 60 are attached to belt 42 (attachment means not shown).

Protruding outwardly from each crest portion 62 of bars 60 are a pair of fingers 66 secured at their respective bases to the crest portion in such a manner as to assume a V-formation, preferably with the plane of the V formed by fingers 66 being substantially perpendicular to the longitudinal movement of the surface of the conveyor belt 42. Stated another way, the plane of the V formed by fingers 66 is substantially parallel to the longitudinal plane of the sinuous bar 60 on which the pair of V-shaped fingers are mounted. Whether the fingers are separate members welded at their lower portions and secured to the sinuous bar by welding, or by threading each finger into corresponding threaded openings in the crests of the bar or are formed by a single strip of material which is bent at its center to form the V configuration and is secured at its center to the crest of the bar, is not important. What is important is that a plurality of pairs of V-shape forming fingers be secured to the crests of the sinuous bars in the manner illustrated in the drawing. In the preferred form of the invention, each sinuous bar has its crest and trough portions offset by 90° with the crest and trough portion of each succeeding bar 60 on the belt 42. Fingers 66 may be of steel or like material and the sinuous or serpentine bars 60 may be of any substantially rigid material, such as metal, hard rubber, plastic, etc., capable of withstanding the operation of the mobile spray applicator for extended periods of time.

As is evident from FIG. 1, the fingers 66 are carried by endless conveyor belt 42 past shield 34 and thus pick up the forage deposited by pick up reel 20. When the forage is hay, corn stalks, or other grasses, a portion of such forage being carried by the endless conveyor belt 42 toward the rear of chassis 10 will be held or supported by the V shaped pairs of fingers while the remainder of the forage will be haphazardly carried by the upper surface 58 of the belt 42. Where one sinuous bar presents a series of crests and trough portions to the pick up end of the forage at shield 34, the next sinuous bar will present a different series of troughs and crests to that pick up end, namely, one where the crests and troughs are about 90° out of phase with those of the preceding bar. The arrangement of the fingers 66 on the sinuous bars, as they pick up the forage deposited on shield 34 by reel 20 and tines 28, assures that the forage will be separated and spread out over the width of the belt 42 so that as the forage is carried toward the exit end 68 of belt 42, one standing above the belt and looking down toward its upper surface, will see the forage supported by the fingers 66 randomly scattered so that a plurality of openings or interstices are formed downwardly through the zone of forage and the observer can see through such openings and interstices to the forage therebelow.

Platform frame 70 on the top of chassis 10 supports a liquid storage tank 72 securely fastened thereto. Removable cap 74 at the top of tank 72 permits the periodic refilling of the tank, as necessary. Tank discharge means 76 are provided at the back end 78 of the tank and include pipe 80, pump 82, and pipe 84 leading to conduit 86 which is spaced above and adjacent to the exit end 68 of the conveyor. A plurality of flood nozzles 88 are spaced along the length of conduit 86 in an arrangement such that the liquid sprayed therefrom covers the upper surface of forage passing thereunder along the width of the conveyor.

Figure 3:
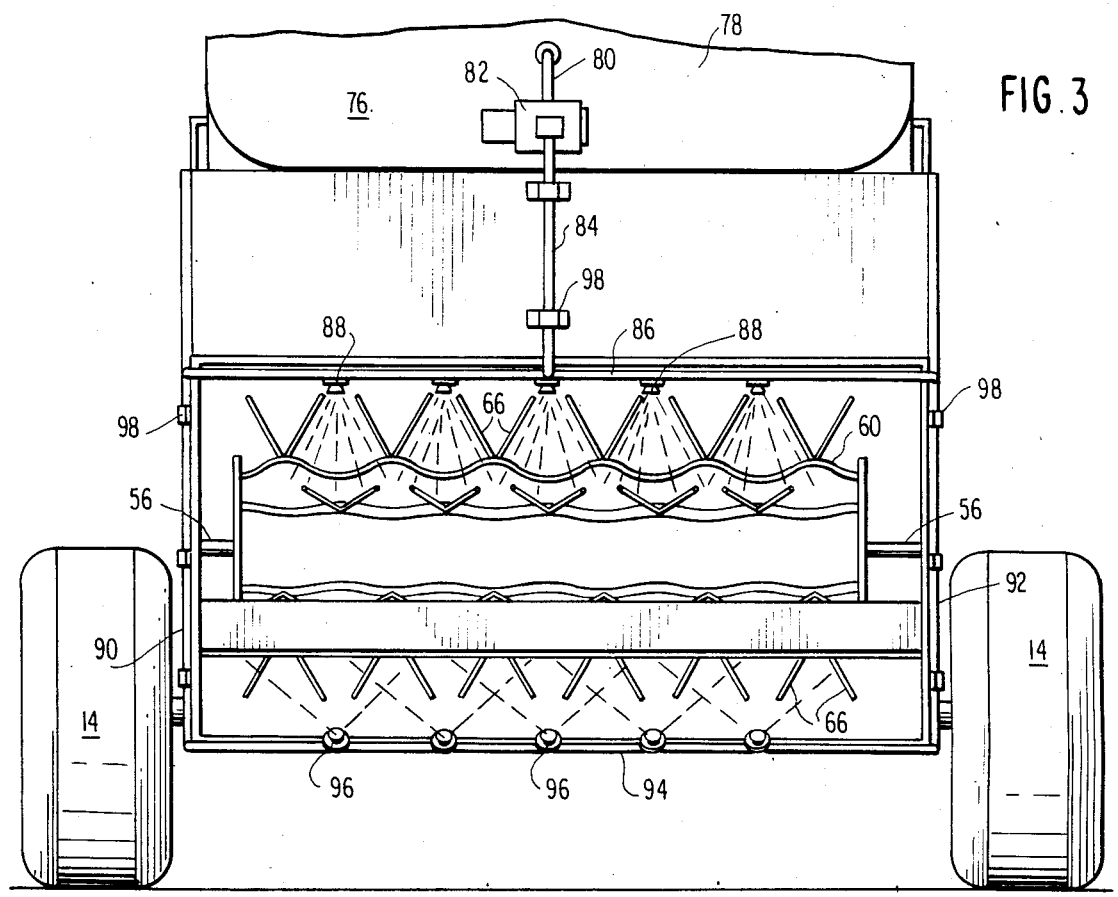
FIG. 3 is a view in rear elevation taken along line 3—3 of FIG. 1.

Each end of conduit 86 extends beyond the width of the endless belt 42 and is bent downwardly to form conduits 90, 92 which connect at their respective ends with conduit 94, the latter also being provided with a plurality of spray nozzles 96. As seen in FIG. 1, spray nozzles 96 are positioned below and rearwardly of the exit end 68 of conveyor belt 42 and are directed upwardly so as to flood or mist spray the undersurface of the forage as it is falling away from the conveyor. Pipe 84 and conduits 90, 92 and 94 are fastened to the chassis 10 by clamps 98. As seen from FIG. 3, members 86, 90, 92 and 94 form a substantially rectangular collar or yoke about the periphery of the exit end 68 of the conveyor. The spraying of the forage can be controlled by the operator of the equipment pulling the mobile spray applicator of the invention and means for controlling such spraying by having the pump 82 conduct the liquid chemical agent from tank 76 to the flood or mist spray nozzles, are known in the art.

Deflector plate 100 (FIG. 1) is attached to the rear of chassis 10 at the exit end 68 of belt 42 and is tilted downwardly to direct the separated and spread out forage, whose upper surface has been coated or wetted by the chemical liquid spray from flood or mist nozzles 88, into the path of flood or mist spray nozzles 96 positioned below deflector 100. In order to permit fingers 66 to pass by deflector 100 as forage is deposited on the latter, the deflector is provided with appropriate slots (not shown) spaced so that no finger hits the deflector and is either broken or it damages the deflector.

A better understanding of the operation of the mobile spray applicator of the present invention may be had by referring to FIG. 4 of the drawing.

By way of example, the spray applicator is towed along a windrow containing undercured forage material requiring treatment with a chemical drying agent prior to baling. Pick up reel 20 is pivoted downwardly to come within close proximity to the ground and to the forage material so that a maximum amount of windrow material may be lifted by tines 28. Pick up reel 20 then deposits the forage onto shield 34 at the front of conveyor belt 42. Fingers 66 pick up the forage from shield 34 and transport it rearwardly toward the exit end 68 of the belt. As the forage, which has been separated and spread out as it was placed on the conveyor, due to the placement of the pairs of fingers as explained above, passes past the exit end 68 of coveyor belt 42, it is flood or mist sprayed by nozzles 88 such that the upper surfaces of the forage passing thereunder is wetted or coated with the sprayed liquid. Because the forage has been spread out across the width of the belt 42 and a portion thereof is supported by the V-shaped fingers which permit openings and interstices to form between the layers of forage being conveyed, the flood or mist spraying assures that the liquid being sprayed penetrates the openings and interstices and thus wets the upper surfaces of the forage located at the bottom of such openings and interstices. As such coated and wetted forage passes beyond deflector plate 100, its undersurface is sprayed as the forage falls away from the deflector plate. Operation of the spray system can be electrically controlled from the cab of the towing vehicle to uniformly spray the windrow material as desired. After being treated in accordance with the invention, the windrow material may then be deposited directly on the ground for further raking and immediate baling, or deposited in a storage means such as a bin for later use, or directed to a conveyor of a following hay baler (not shown), and baled. Of course, the same applicator and process is employed to spray the forage with other chemical compounds, such as nutrients, or artificial flavors. Alternatively, the mobile spray applicator may be employed to spray dessicated forage material, such as overcured hay, with water to moisten the hay to a desirable moisture content to prevent crumbling during the subsequent baling process.

As illustrated in FIG. 1, fingers 66 picking up forage from shield 34 do not pass through any portion of the shield while in the embodiment shown in FIG. 4, the fingers 66 pass through appropriate slots (not shown) in shield 34.

The mobile spray applicator of the invention is particularly useful in treating many of the grasses which usually do not make acceptable feed for livestock for one reason or another. By windrowing such grasses and then treating them in accordance with the invention so as to coat the grasses with nutrients or supplements or even flavorings, such as alfalfa flavoring, such windrowed grasses can be converted to more desirable feed and such conversion can be expeditiously and economically made. Substantially most of the surfaces of such grasses can be flood or mist sprayed and coated by the apparatus and process of the invention so that it becomes profitable for the farmer to bale such poor or unwanted grasses and ship the baled crop to those areas where it can be sold and used as livestock feed.

Although the present invention has been described primarily with reference to a preferred embodiment, rearrangements and modifications may be made by one skilled in the art within the scope of the invention.

What is claimed is:

1. A mobile spray applicator for forage comprising means for picking up forage, conveyor means having a receiving end positioned to receive said forage from said pick up means and an exit end, said conveyor means conveying said forage away from said pick up means, said conveyor means including spreading means for spreading said forage across said conveyor means and separating said forage while holding a portion of said forage spaced above said conveyor means, first flood or mist spraying means positioned above said exit end of said conveyor means for flood or mist spraying the upper surface of said forage as it exits said conveyor means, and second flood or mist spraying means positioned below said exit end of said conveyor means for flood or mist spraying the undersurface of said forage as it is falling away from said conveyor means.

2. The mobile spray applicator for forage as defined in claim 1 wherein said spreading means comprises a series of fingers positioned to hold forage therebetween, said series of fingers being spaced from the surface of said conveyor means and adapted to hold at least a portion of said forage above said surface of said conveyor means.

3. The mobile spray applicator for forage as defined in claim 2 wherein each of said series of fingers comprises a pair of outwardly extending fingers in V formation, and means fastened to said conveyor means and to the lower portion of said pair of fingers to maintain said fingers spaced from the surface of said conveyor means.

4. The mobile spray applicator for forage as defined in claim 3, wherein the V formed by each pair of fingers is in a plane that is substantially perpendicular to the movement of the surface of said conveyor means.

5. A mobile spray applicator for forage comprising:

means for picking up forage, conveyor means having a receiving end positioned to receive said forage from said pick up means, a surface for conveying said forage away from said pick up means, and an exit end, said conveyor means including spreading means for spreading said forage across said conveyor means while holding a portion of said forage spaced above said conveyor means, said spreading means including a plurality of sinuous members fastened to said surface of said conveyor means at points of contact between said members and said surface, and a series of fingers fastened to those portions of said sinuous members spaced from said surface, said series of fingers adapted to hold at least a portion of said forage above said conveyor means;

first flood or mist spraying means positioned above said exit end of said conveyor means for flood or mist spraying the upper surface of said forage as it exits said conveyor means, and second flood or mist spraying means positioned below, said exit end of said conveyor means for flood or mist spraying the undersurface of said forage as it is falling away from said conveyor means.

6. The mobile spray applicator for forage as defined in claim 5 wherein each of said series of fingers comprises a pair of outwardly extending fingers fastened to said sinuous members at those portions spaced from the surface of said conveyor means.

7. The mobile spray applicator for forage as defined in claim 6 wherein the V formed by each pair of fingers is in a plane substantially perpendicular to the movement of the surface of said conveyor means.

8. The mobile spray applicator for forage as defined in claims 5 or 6 wherein each of said sinuous members fastened to the surface of said conveyor means has its crests and troughs approximately 90° out of phase with the crests and troughs of the sinuous member next adjacent to it.

9. A mobile spray applicator for forage comprising means for picking up forage from the ground, endless conveyor means positioned to receive said forage from said pick up means and to convey it away therefrom, a plurality of sinuous members secured to the surface of said conveyor means, said members being substantially uniformly spaced from each other, spreading means for spreading said forage across the surface of said conveyor means while holding a portion of said forage spaced above said conveyor means, said spreading means comprising a series of fingers secured to said sinuous members at points on said members spaced from the surface of said conveyor means, first flood or mist spraying means positioned above the exit end of said conveyor means for flood or mist spraying the upper surface of said forage as it exits said conveyor means, second flood spraying means positioned rearwardly and below said exit end of said conveyor means for flood or mist spraying the undersurface of said forage as it is falling away from the exit end of said conveyor means, a chassis having wheels and adapted for movement along the ground, said means for picking up forage, said conveyor means and said first and second spraying means being positioned on said chassis, a liquid storage tank on said chassis, and pump means for pumping liquid from said storage tank to said first and second flood or mist spraying means.

10. The mobile spray applicator for forage as defined in claim 9 wherein said first flood or mist spraying means includes a first conduit spaced above and adjacent to the exit end of said conveyor means for receiving liquid from said liquid storage tank and a plurality of flood or mist spray nozzles connected to said conduit, and said second flood or mist spraying means includes a second conduit spaced below and adjacent to the exit end of said conveyor means for receiving liquid from said storage tank and a plurality of flood or mist spray nozzles connected to said conduit.

11. The mobile spray applicator for forage as defined in claims 9 or 10 wherein each of said sinuous members fastened to the surface of said conveyor means has its crests and troughs approximately 90° out of phase with the crests and troughs of the sinuous member next adjacent to it.

12. A method of treating forage comprising the steps of picking up the forage from the ground, introducing the forage into a zone remote from the ground, spreading out and separating the forage across the width and height of said zone to provide openings in said forage while conveying said separated and spread out forage through said zone, flood or mist spraying a chemical agent on the upper surface of said spread out forage as said forage exits said zone and flood or mist spraying said chemical agent on the undersurface of said forage as said forage is falling away from said zone, whereby a substantial amount of the surface area of said forage is contacted by said agent.

* * * * *